Figure 1:
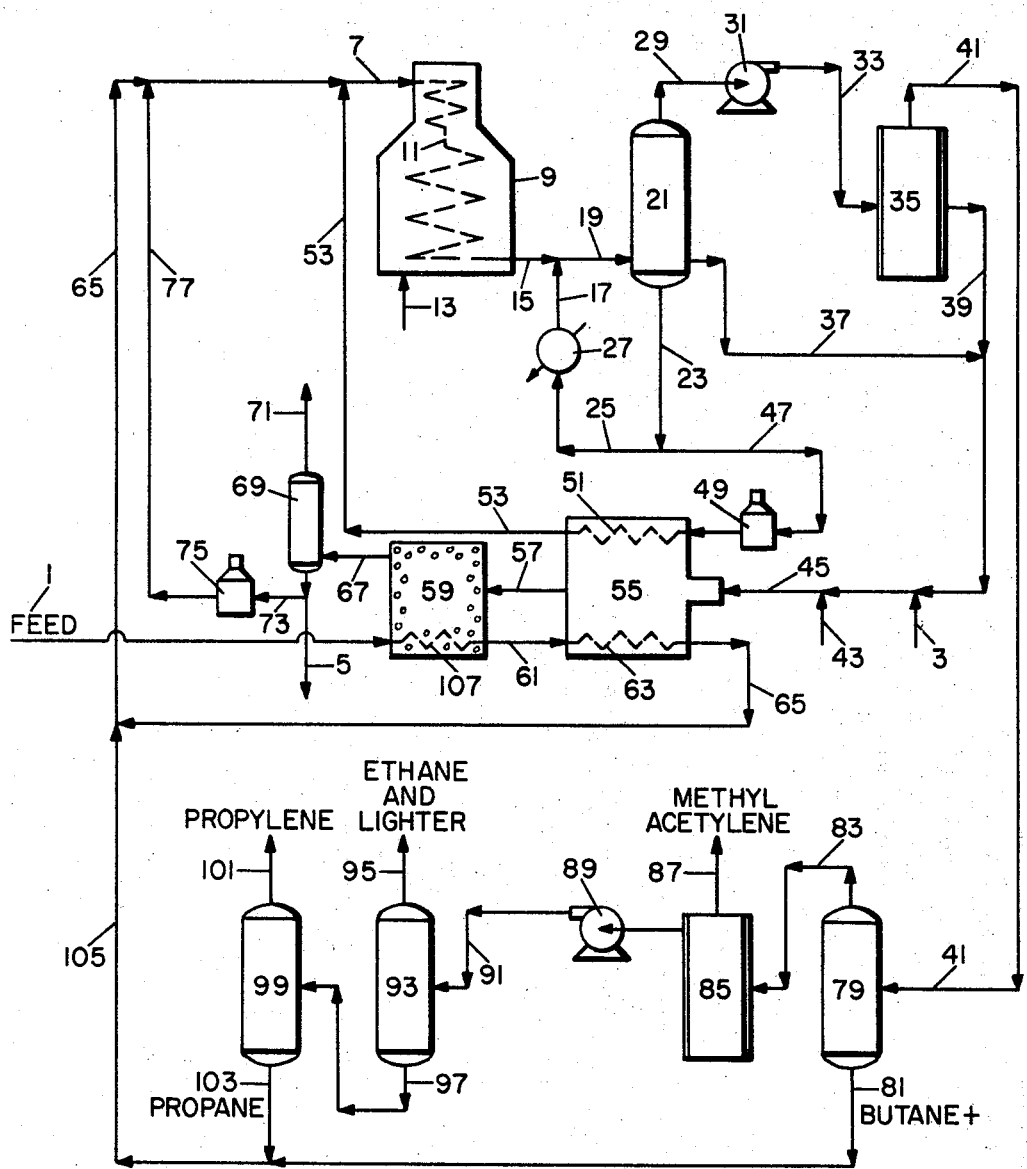

United States Patent Office 3,344,203
Patented Sept. 26, 1967

3,344,203
PRODUCTION OF METHYL ACETYLENE AND PROPYLENE
Seymour C. Schuman, Rocky Hill, N.J.
(360 Jefferson Road, Princeton, N.J. 08540)
Filed June 7, 1965, Ser. No. 461,683
20 Claims. (Cl. 260—678)

This invention relates to the production of methyl acetylene and propylene from propane, butane and similar light hydrocarbons.

The production of methyl acetylene as a major product is a feature of this invention. If available at lower cost than at present, methyl acetylene would have extensive applications for polymerization to plastics and fibers, and for use as a high energy fuel. As is well known, propylene is a presently important chemical of commerce, being useful for a variety of purposes such as the production of isopropanol and polypropylene.

I have found that various aliphatic hydrocarbons such as propane or butane can be reacted with elemental sulfur at temperatures in the range of 1000° F. to 1450° F. to produce excellent yields of methyl acetylene and propylene. I have designated this reaction as sulfoxidation. If the suloxidation reaction is practiced below 1000° F., yields of methyl acetylene are very low and the yields of propylene considerably reduced. If temperatures exceed 1450° F., cracking of propane to unsaturated compounds of a lower carbon number such as ethylene exert a subtractive effect on the value of the products. However, in the range of 1000° F. to 1450° F. using a suitable quantity of elemental sulfur, the most valuable combinations of yields of methyl acetylene and propylene are obtained.

The reactions effected in my invention are similar to those of dehydrogenation, in that the products contain substantially less hydrogen than the feed. The use of elemental sulfur as a primary reactant, however, confers considerable and basic advantages both with respect to yields, and to the engineering of the process. Most importantly, yields of methyl acetylene seem to be much greater than can be obtained in simple dehydrogenation. In addition, the endothermic heat requirements of sulfoxidation are much less than those of simple dehydrogenation. Finally, but not leastly, since my process is very selective, recovery and purification equipment are considerably simplified.

Although my invention effects a hydrogen abstraction similar to that obtained in simple dehydrogenation, hydrogen sulfide is produced along with the desired unsaturated compounds, instead of the molecular hydrogen obtained in simple dehydrogenation. An economically important aspect of the invention is the reconversion of this hydrogen sulfide to elemental sulfur, by the exothermic reaction

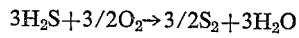

Thus, when this reconversion step is practical concomitantly with the sulfoxidation step, as for example

the overall reaction is an oxidation, i.e.,

and is exothermic with the usual important advantages of such exothermic reactions with respect to fuel savings. Reactions involving the oxidation of hydrocarbons using air are difficult to control and unselective, because of the production of carbon monoxide and carbon dioxide. My invention, when practiced with the two steps of sulfoxidation and reconversion, provides a method for controlling the difficult oxidation reaction, whereby greater selectivity and higher yields of more desirable products are obtained, and in which, theoretically, there is no net consumption of elemental sulfur.

Hydrocarbon gases advantageously processed by my invention include refinery gases, propane, butane, pentane, natural gasoline, and light and heavy naphtha. Propane is a preferred feed. Such propane may contain substantial quantities of propylene (such as is the $C_3$ fraction derived from catalytic cracking), the objectives of treating this mixture without propylene separation being to substantially convert the propane present and to produce methyl acetylene. Mixtures of propane with butane, or $C_4$ compounds by themselves are also satisfactory feeds. Higher hydrocarbons are less preferable as feeds but may be advantageously used where propane and butane are unavailable.

Although elemental sulfur is a primary reactant of the sulfoxidation step, little or no net consumption of sulfur need occur in the overall process when the reconversion step is employed. However, in all cases, sulfur must be present in the feed to the sulfoxidation step, and the sulfur content of the feed (including recycled hydrocarbons if such recycle is employed) is preferably from 0.25 to 2.5 moles of sulfur (as $S_2$) per mole of $C_3$ and heavier hydrocarbons the total feed. (For simplicity, here and elsewhere, I have used the formula $S_2$ for elemental sulfur, although it is well known to those skilled in the art that elemental sulfur may exist as $S_2$, $S_6$, $S_8$ and the like). The concentration of sulfur in the feed is quite critical, for if the sulfur concentration is too low, it will be impossible to produce useful quantities of methyl acetylene, whereas high sulfur concentrations are uneconomic and tend to increase tar yields. With a feed such as propane, the mole ratio of sulfur in the feed will tend to be higher than with a feed such as naphtha, always within the range specified above.

Steam may or may not be present in the sulfoxidation step, although it is generally unnecessary. Other sulfur-containing gases such as hydrogen sulfide, carbonyl sulfides, sulfur dioxide and carbon disulfide do not deleteriously affect the sulfoxation reaction, and in some cases it may be desirable to include such gases as minor components of the feed.

As previously indicated, sulfoxidation reaction temperatures are in the range of 1000° F., to 1450° F. (In cases where the reaction is carried out in a system which is not isothermal, the reaction temperatures here designated are the average temperatures in the reactor). Reaction temperatures depend on the composition of the feed, the reaction system employed, the sulfur content of the feed, the contact time, and the desired ratio of methyl acetylene to propylene. Even more importantly, if catalysts are employed, reaction temperatures will tend to be at the lower limits of the range specified, whereas if catalysts are not used, reaction temperatures will tend to be much higher.

My invention may be employed with a broad range of contact times or reactor space velocities in the sulfoxidation step reaction zone. Generally, when low temperatures are employed, usually with catalysts, contact times may be as high as about 100 seconds. However, when my invention is employed at the higher temperature limits of the range specified, generally without catalysts, contact times as low as 0.5 second may be employed. Again, the precise contact time used in a given application of this invention depends upon the composition of the feed and other reaction variables in addition to temperature. Since in some of the reaction systems which may be used, the reaction temperature may not be constant throughout the reaction zone, the contact time as here specified is that extent over the part of the reactor above 1000° F.

The preferred sulfoxidation reaction pressure is essentially atmospheric, i.e. between 5 p.s.i.a. and 100 p.s.i.a. In most cases, it is desirable that the pressure be as close to atmospheric as is possible. However, unavoidable pressure drops in reactors and in recovery systems may require that somewhat higher total pressures up to about 300 p.s.i.a. be used.

Employing the above-stated feeds and reaction conditions, commercially valuable yields of methyl acetylene are always obtained together with propylene, the relative proportions of these major products depending specifically on the feed and reaction conditions which are employed. Obviously, unconverted feed may be recycled to increase yields of these desired major products. Furthermore, propylene may also be recycled to increase yields of methyl acetylene. If desirable, propylene may be recycled to extinction to produce substantially only methyl acetylene.

Various reaction systems may be employed in the process of this invention; these may be non-catalytic or catalytic. In a preferred non-catalytic reaction system, a tubular furnace of conventional design may be employed. However, in the process of this invention, since the endothermic reaction heat is relatively low, as a result of using elemental sulfur as a reactant, undesirably high heat fluxes may be substantially avoided. Systems with non-catalytic contact agents may also be employed. In such cases solids such as sand, coke, alundum, and the like are used essentially as heat sinks. When such particulate solids are used, they may be continuously transported from the reaction zone and reheated by burning off the coke and/or contacting the solids with any hydrocarbon fuel and air, after which they may be transported back to the reactor zone to supply the endothermic reaction heat requirements. Another way often used to employ such non-catalytic solids is the fixed bed cyclic regeneration system in which the feed is contacted with hot solids for certain periods of time until the solids cool, after which the feed is discontinued and the solids regenerated and reheated; in this case, it is apparent that the use of multiple beds permits continuous production.

In many cases, catalysts may be advantageously used in the process of my invention. The sulfides of molybdenum, vanadium, chromium, tungsten, cobalt, and nickel are preferred active catalytic components for the sulfoxidation step. However, many other sulfides in periodic groups IVA, IVB, VA, VB, VIA, VIIA and VIII will similarly be active, as well as the sulfides of many of the rare earth metals with atomic numbers between 59 and 72. Typical active metals in each of these groups are Ce(IVA), Zn(IVB), Ta(VA), Bi(VB), U(VIA), Mn(VIIA) and Ru(VIII) as well as rare earths such as Dy.

Suitably prepared mixtures of more than one of the above sulfides may be more active than the separate components individually. For example, it is well known that mixtures containing both cobalt and molybdenum are more active than the separate components. Nickel and tungsten seem similarly to enhance the activity of each other. The reason for such co-promotion is not generally known.

Catalysts used in this invention may be in admixture of in combination with relatively inert materials such as for example, activated alumina, silica gel, activated clays, magnesia gel, alumina gel, zirconia gel, activated bauxites, synthetic aluminum silicates, carbon and the like. The use of such "supports" to enhance the activity of metals and metal compounds is common practice. It is presumed that such supports disperse active metals and metal compounds in such a way so as to make them more available to reactants. Even inert materials with little extended surface, such as carborundum, carbon black, alundum, pumice and the like, are of value to extend the availability of active catalytic components. These materials are particularly important in this invention when the active catalytic component is of high cost, such as Pt, Ce or Ru.

Promotion with alkali compounds, particularly those of potassium and, secondarily, those of sodium, lithium and rubidium, may be employed. In this case, the alkali compound ultimately comprises not more than 5% and preferably between 1% and 2% by weight of the catalyst.

The catalyst may be prepared by any of the methods known to those skilled in the art. These including mixing dry powders, pasting dry powders, impregnating or precipitating active components onto the support, or in some cases coprecipitating all of the catalyst components simultaneously. The catalyst components are in most cases then pelleted, extruded, spheroidized or otherwise formed into desired sizes and shapes, and the particles then preferably dried and calcined at a temperature above 900° F.

Although the raw materials for the catalysts used in my invention may be metallic salts such as nitrates, carbonates, sulfates, phosphates, acetates, and the like, or the metal oxides, or in rare cases the metals themselves, which then may be further converted in the process of catalyst preparation generally to oxides, the ultimate catalytic components which are extant and active in the process of this invention are substantially metal sulfides. Conversion to the sulfides may be effected ex situ by treating the catalyst after calcination with sulfur-containing compounds such as hydrogen sulfide, mercaptans, or thiophenes, with or without hydrogen. Such conversion may also be carried out in the same reactor used for the process of this invention. In some cases such a pretreatment is not necessary, since the active catalytic sulfide may be formed by initiating the reaction between the hydrocarbon and elemental sulfur as in the process of this invention. However, in all cases in which the process is conducted catalytically, it is carried out over one or more metallic sulfides which substantially catalyze the desired sulfoxidation reactions.

Quenching of the reaction products from the sulfoxidation step may or may not be required. When the reaction is carried out at the lower limits of the temperature range specified, quenching is usually not required, for non-catalytic reactions will not occur at any appreciable rate at these temperatures. When the reaction is carried out at the higher limits of the temperature range specified, however, quenching of the reactor effluent stream may be desirable. This can be done by contacting the reactor effluent gases with any liquid, preferably one available such as elemental sulfur or feed or product hydrocarbons, the amount of the liquid used and its temperature being such as to decrease rapidly the temperature of the effluent to the desired level.

When a catalyst is employed in the sulfoxidation step, some coke may be formed, the amount depending on the feed, reaction temperature and pressure, extent of single pass conversion, catalysts, and other operating variables. It may be desirable to regenerate the catalyst periodically, therefore, and this may be accomplished using air, dilute oxygen, oxygen and steam, and the like, as conventionally practiced for many other catalytic hydrocarbon conversion processes. After such a regeneration it may be necessary to resulfide the catalyst before use. For this reason, elemental sulfur may be used for regeneration, instead of oxygen-containing gases, in which case the coke on the catalyst is removed by reaction to produce carbon disulfide. Where sulfur is so used, catalyst regeneration is practiced simply by shutting off the hydrocarbon feed and raising temperature if necessary; after the desired quantity of catalyst coke is removed, the hydrocarbon feed is simply re-initiated with no resulfiding of the catalyst required.

Conversion of hydrogen sulfide to elemental sulfur may be accomplished by a two-stage process commonly called the "Claus process." In the first stage the hydrogen sulfide is burned with an oxygen-containing gas (conventionally air) to produce sulfur dioxide at temperatures of between 1300° F. and 3000° F.; and, in the second stage, the sulfur dioxide is catalytically combined with additional hydrogen sulfide at about 500° F. to produce elemental sulfur, as represented by the following equations:

$$H_2S + 3/2O_2 \rightarrow SO_2 + H_2O$$
$$2H_2S + SO_2 \rightarrow 3/2S_2 + 2H_2O$$

Two modifications of this classic process exist: the first, in which all of the hydrogen sulfide is mixed with an insufficiency of air for entry into the first stage combustion zone; the second, in which only one-third of the hydrogen sulfide is inserted into the first combustion zone, with the remaining two-thirds by-passed to enter the second catalytic zone.

I have found that the heat released by the highly exothermic reconversion reactions, e.g., the Claus process or modifications thereof, is quite vlauable for carrying out the sulfoxidation reactions. Both stages of the reconversion process are exothermic and, as noted above, the first stage combustion is carried out at very high temperatures. In conventional Claus process technology, available heat is converted to low and moderate pressure steam. However, in the process of my invention, the exothermic heat released in the overall reconversion process (a minimum of about 2000 B.t.u. per pound of elemental sulfur produced) fully satisfies the endothermic heat required to carry out the desired sulfoxidation reactions (1000–1600 B.t.u. per pound of elemental sulfur converted), so that it is possible in many cases to utilize the heat from the reconversion reactions to preheat the reactants to the sulfoxidation step above the reaction temperature in this step, to the extent required to carry out the sulfoxidation reactions adiabatically. Since the first (combustion) stage of the reconversion step is carried out at temperatures of between 1300° F. and 3000° F., and since the sulfoxidation reactions are carried out between 1000° F. and 1450° F., not only does the reconversion step provide an adequate quantity of heat, but it provides an adequate temperature level. If desirable, both the total quantity of heat and the temperature level may be increased by increasing the quantity of hydrocarbons contained in the hydrogen sulfide fed to the reconversion step; this may be accomplished by using $C_1$ and $C_2$ hydrocarbons produced in the sulfoxidation reactions, which have generally no value other than for fuel.

In most cases it is also desirable to pass small amounts of organic sulfur compounds produced in the sulfoxidation reactions to the reconversion step. Such a practice eliminates the need for disposing of undesirable by-products and increases the total heat available and the temperature level of the reconversion step; similarly by this practice there is little net usage of elemental sulfur in the overall process.

Utilization of the heat available from the reconversion step may be carried out by various methods known to those skilled in the art. Of considerable importance in this respect is the fact that advances in materials of construction have permitted direct heat exchange to be practiced at temperatures as high as 1200° F. and, in special cases, as high as 1500° F. In exchanging the feed components to the sulfoxidation step (generally elemental sulfur and hydrocarbons), it is not desirable to carry hydrocarbon-containing streams to a temperature level above 1300° F., and preferably not above 1200° F., because of thermal decomposition and coking in the exchangers. However, sulfur alone may be preheated to as high a temperature economically possible without such fear.

In conventional practice of the Claus process, elemental sulfur is a product and is generally separated from the co-produced water (and small amounts of carbon dioxide, sulfur dioxide and unreacted hydrogen sulfide), and from the large quantity of nitrogen residual from the air used in the combustion stage. However, in the process of my invention the elemental sulfur formed in the reconversion step may be reused directly. Since the water vapor, nitrogen, and traces of sulfur dioxide, carbon dioxide and hydrogen sulfide are not a priori deleterious in the sulfoxidation reactions, in some cases it may be advantageous to pass the total effluent from the reconversion step directly to the sulfoxidation step. This is particularly so in those cases wherein it is advantageous to carry out the sulfoxidation at the higher levels of total operating pressure used in this invention, but with reduced partial pressures of the reactants. In such event, the steam and nitrogen from the reconversion step act as diluents in reducing the partial pressure of the hydrocarbons and elemental sulfur in the sulfoxidation reactor. It is apparent that many possibilities exist in this respect, such as, for example, removing the steam but not the nitrogen, or vice versa.

If more or less pure oxygen is used in the reconversion step, instead of air, the temperature level of the first (combustion) stage of the reconversion is considerably raised and, more importantly, there is little or no nitrogen in the reconversion step effluent. This, then, simply and advantageously provides sulfur with a steam diluent to the sulfoxidation reactions if desirable.

Figure 2:
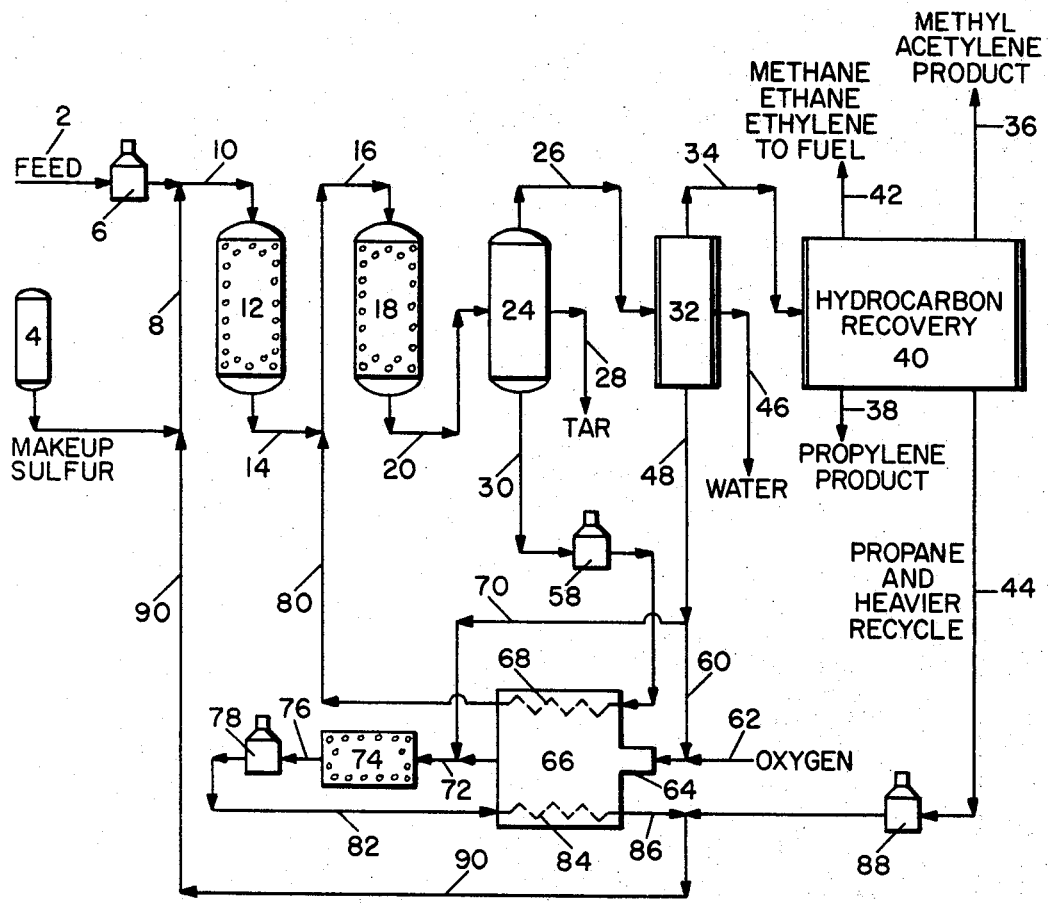
Figure 3:
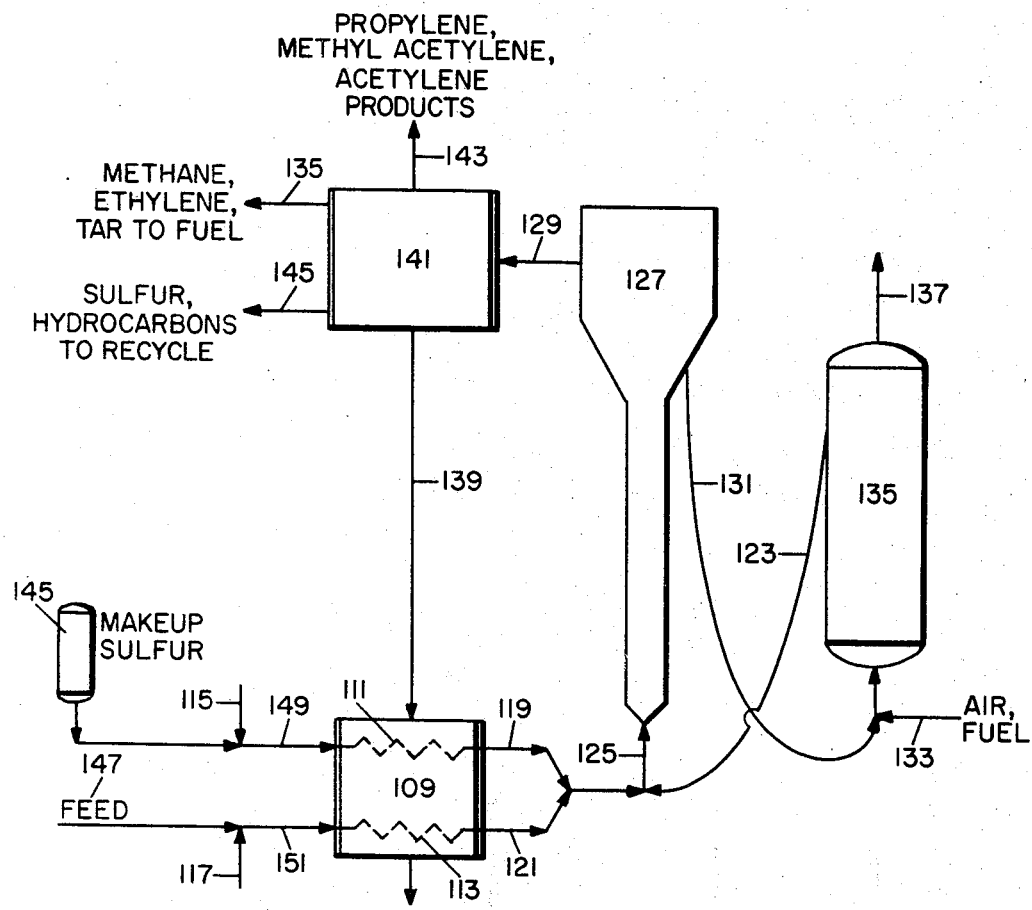

FIGURES 1, 2 and 3 are diagrammatic flowsheets of several illustrative plants by which the invention may be practiced. For reasons of simplicity, miscellaneous vessels, heaters, coolers, pumps, compressors, and other conventional equipment which would be employed in a specific commercial embodiment may be omitted from these illustrations.

FIGURE 1 illustrates an embodiment of this invention which utilizes a conventional fired reactor to carry out the sulfoxidation step. The reaction temperature in this case is about in the middle of the range specified. The hydrogen sulfide obtained from sulfoxidation is reconverted to elemental sulfur in a Claus plant also used for other purposes within the overall plant site of which the sulfoxidation plant is part. In this case then, the small net quantity of elemental sulfur required for the sulfoxidation process is obtained ultimately from hydrogen sulfide from another source which is converted to elemental sulfur in the common reconversion plant.

The hydrocarbon fresh feed stream isues from source 1 and is preheated in exchanger 107 by the reaction heat from the second sulfur reconversion stage. The feed then passes through line 61, and is further heated in exchanger 63 against the combustion gases from the first (high temperature) sulfur reconversion stage. The fresh feed hydrocarbon stream, now at an elevated temperature, passes through line 65 and ultimately enters the reactor through line 7.

Three additional streams provide the total reactor feed. One of these is a stream of recycled higher hydrocarbons obtained from line 105 as will be described. The other feed streams comprise the elemental sulfur fed to the reactor; as will be described, these are the unreacted sulfur recycled through line 53, and the sulfur obtained from the reconversion step issuing from line 77. The combined feed stream enters the reactor through line 7.

The reactor in this case is a conventional coil-type pyrolysis furnace. As indicated schematically in FIGURE 1, the furnace shell is shown as 9, the coil as 11, and the fuel-air mixture as 13. The reactor system is designed to operate within the temperature, and pressure limits as specified below. Products issue from the reactor system at 15 and are immediately quenched by a liquid stream, in this case liquid elemental sulfur from 17. The products then proceed to tower 21 where sulfur and tar are separated out individually. The sulfur issues from the tower at 23. Part of this sulfur then proceeds through line 25 and cooler 27 to provide the quench stream at line 17, as stated. The remainder of the sulfur passes through line 47, is reheated in furnace 49 and passes to exchanger 51 where it is additionally heated by exchange against the first stage reconversion effluent. This stream then passes into the line 53 for recycle to the reactor.

The uncondensed products from separator 21 issue through line 29, are compressed by compressor 31 and passed to the hydrogen sulfide removal system through line 33. The hydrogen sulfide removal system shown schematically at 35, consists, in this case, of a conventional ethanolamine system with various components for absorption, stripping, and the like, not shown. The stripped hydrogen sulfide issues from the scrubber system through line 39, is combined with a small amount of low-boiling sulfur compounds from line 37, and passes to the reconversion step.

As mentioned above, the reconversion unit is a common unit for various sour gas stripping operations. Hydrogen sulfide from the facilities external to the sulfoxidation unit is shown entering at 3, joining the stream of hydrogen sulfide and tar from the sulfoxidation unit. The requisite amount of air from 43 is combined with the stream of hydrogen sulfide and tar and enters the burner through line 45. The burner system, indicated at 55, is designed to burn the sulfur compounds after which the combustion products are cooled by exchangers 51 and 63 as described. Some steam also may be raised in this conversion stage. The products from the combustion stage issue through line 57 and proceed to the second reconversion stage 59, the latter as practiced conventionally. The effluent from this stage issues through line 67 into tower 69 where elemental sulfur is separated from nitrogen and steam and small amounts of carbon oxides and sulfur-containing gases; the latter are removed through line 71. Elemental sulfur is withdrawn as a product through line 5, this quantity being slightly less than that corresponding to the hydrogen sulfide fed at 3. The remainder of the elemental sulfur, corresponding to that reconverted from the sulfoxidation step, together with a small quantity derived from the extraneous hydrogen sulfide source at 3, passes through line 73, is reheated in a heater 75 and passes back to the reactor through line 77.

The gaseous effluent from the hydrogen sulfide scrubbing system 35, comprising the propylene and methyl acetylene products as well as other light gases, proceeds through line 41, and after cooling, enters tower 79. The tower bottoms, comprising hydrocarbons such as butane and heavier, are withdrawn from the tower through line 81; these hydrocarbons may be recycled to the reactor through lines 105 and 65 to provide additional propylene and methyl acetylene. The overhead from tower 79 passes into the methyl acetylene recovery system.

The methyl acetylene recovery system 85, shown schematically, may comprise any suitable removal and purification arrangement. Usually, a conventional solvent-absorbtion-stripping system is used, with solvents such as acetone, methanol, ammonia, dimethyl formamide, and n-methyl pyrrolidone, or the like. Methyl acetylene is shown as a product of this system at 87.

The methyl acetylene-free product gas is then compressed in compressor 89, cooled, and passed through line 91 into tower 93. In this case, uncondensable gases such as ethane, ethylene, methane, and a small amount of hydrogen are removed from the top of the tower through outlet line 95; this stream may be used for miscellaneous plant fuel requirements such as shown diagrammatically at 13. A stream, predominantly propane and propylene, is removed from the bottom of the tower through line 97 and then enters the propanepropylene tower 99. The propylene product may be removed from the top of this tower through line 101, and propane is removed from the bottom of the tower through line 103. The propane stream may be recycled to the reactor through lines 105 and 65; this stream may contain propylene if it is desirable to produce larger quantities of methylacetylene relative to propylene.

FIGURE 2 illustrates an embodiment of this invention for producing methyl acetylene and propylene at the lower temperature limits of the range specified herein. A two-stage sulfoxidation reactor system is employed, with a product recovery system sufficiently similar to that of FIGURE 1 that it is merely indicated schematically in rectangle 40.

The hydrocarbon feed from source 2 is preheated in heater 6 and, together with a small amount of make-up sulfur from storage vessel 4, passes to reactor 12 through line 10. A much larger amount of sulfur from the reconversion step likewise passes to the reactor through lines 86, 90, 8 and 10. The final stream entering reactor 12 is a hydrocarbon stream originating from hydrocarbon recovery system 40, and passing through lines 44, heater 88 and lines 90, 8 and 10 into the reactor. The combined feed is substantially above the average temperature of reactor 12.

Reactor 12 is in this case a simple, adiabatic, cylindrical vessel containing catalyst. The catalyst is prepared by coprecipitating equal quantities by weight of the sulfides of iron and manganese, by passing hydrogen sulfide through solutions of the salts. The sulfide composite is then dried, a small quantity of binder added, and the total mass pelleted to 3/16 inch diameter pellets and calcined at 1000° F. in a nitrogen atmosphere. The catalyst thus prepared is composed of metal sulfides and requires no further treatment before use. The reactor effluent issuing from line 14 is at a substantially lower temperature than the feed.

The first reactor stage effluent mixes with additional elemental sulfur obtained as will be described from line 80, and then passes through line 16 to enter the second stage reactor 18. This reactor is in this case also a simple, cylindrical vessel containing catalyst, and the reaction in this stage is also carried out adiabatically. The second stage catalyst is composed of about 11% bismuth oxide on activated carbon, and is prepared by simple impregnation of 1/8 inch carbon granules. The catalyst is reduced by treatment with hydrogen for 30 minutes at 650° F. before charging to the second stage reactor. When the unit is brought on stream, as in the process of this invention, the sulfoxidation reactions occurring in the first stage produce hydrogen sulfide which, when passed to the second stage, rapidly converts the bismuth in this stage to a sulfide which is then effective to complete the desired sulfoxidation reactions.

The reaction products issue through line 20 and, without quenching, into tower 24. Three streams are obtained from the tower. A small stream of tar and organic sulfur compounds is withdrawn through line 28 as a product. A much larger stream of unconverted elemental sulfur passes through line 30, is vaporized by heater 58, passed through tubes 68 to exchange with the first stage reconversion gases, and then through line 80 to provide the additional sulfur fed to the second stage reactor 18. Thus, in this case the overall excess of sulfur used in the sulfoxidation reactions is recycled to the second stage sulfoxidation reactor only.

The overhead from the primary separator 24 proceeds through line 26 into the hydrogen sulfide absorption system 32 which scrubs out the hydrogen sulfide, as described in connection with FIGURE 1. The unabsorbed hydrocarbon gases leave the hydrogen sulfide absorption system through line 34, and are then cooled and passed to the hydrocarbon recovery system 40.

The hydrocarbon recovery system is conventionally designed as shown in FIGURE 1. From the recovery system, propylene and methyl acetylene products are removed at 38 and 36, respectively. A light gas stream containing primarily methane, ethane, and ethylene together with small quantities of hydrogen, nitrogen, hydrogen sulfide and argon is removed at 42; this stream may be utilized as plant fuel. Propane, often containing substantial quantities of propylene, particularly when it is desirable to obtain the highest methyl acetylene yields, is removed from the hydrocarbon recovery system at 44, and after reheating in 88, passes through lines 90, 8, and 10 back to the sulfoxidation reaction system.

The system for the reconversion step shown in FIGURE 2 is a "by-pass" system in which one-third of the hydrogen sulfide is fed to the first (combustion) stage through line 60, with the other two-thirds fed to the lower temperature catalytic chamber through line 70 as dictated by stoichiometric requirements. In this case, 95% oxygen is used in the first (combustion) stage supplied through line 62. The oxygen and hydrogen sulfide are burned in chamber 64 and then exchanged with two other streams in exchanger 66. One of the exchange streams is the unreacted vaporized sulfur, as described previously. The second stream is the total effluent from the reconversion step obtained as will be subsequently described. After leaving exchanger 66, the combustion gases combine with additional hydrogen sulfide from line 70 as described, and enter the catalytic reconversion reactor through line 72. The catalytic chamber 74 is a more or less conventional second stage Claus reactor, but may be somewhat smaller and more economically designed because of the use of 95% oxygen instead of air for the combustion step. In this case, the products leaving the second stage of the reconversion step comprise essentially sulfur and water with small quantities of nitrogen and argon which originate as impurities of the oxygen used for the combustion, and some unreacted hydrogen sulfide and sulfur dioxide. These proceed through line 76 to heater 78 without separation of sulfur, and then through line 82, after which they are exchanged in tubes 84 against the combustion gases in exchanger 66. The heated stream issues from the exchanger through line 86 and, without further heating, proceeds ultimately back to the sulfoxidation reaction stages through lines 90, 8, and 10. Thus, in this case the reconverted sulfur is recycled into the sulfoxidation step together with steam, the latter ultimately eliminated at 46.

FIGURE 3 illustrates an embodiment of this invention in which the sulfoxidation step is carried out over a substantially non-catalytic contact agent, in this case sand. Since the reconversion and recovery steps have been illustrated in FIGURES 1 and 2, they are indicated only schematically in FIGURE 3. The embodiment illustrated in FIGURE 3 is generally useful at the higher limits of the temperature range specified herein. At such temperatures, in addition to propylene and methyl acetylene, enough acetylene may be produced to make its recovery worthwhile.

The hydrocarbon feed from source 147, together with recycled hydrocarbons from line 117, passes through line 151, is preheated by exchange against the reconversion step in exchanger 113, and issues through line 121. A small amount of make-up liquid sulfur from 145 is joined with a larger amount of sulfur from line 115, the latter comprising (a) sulfur recycle from the reactor effluent, and (b) sulfur obtained by reconversion of the hydrogen sulfide formed in the sulfoxidation reaction. The total sulfur stream at 149 is preheated by exchange against the reconversion step gases in exchanger 111, and then passes through line 119 to join the hydrocarbon stream 121. The combined feed then picks up regenerated sand from line 123, and the feed-sand mixture passes through line 125 to the reactor 127. Again, the reactor is designed to provide temperatures, pressures, and contact times as specified herein. The reaction products, freed of the sand carrier by means of conventional devices, leave the reactor through line 129.

The sand, now containing substantially more carbon and being at a substantially lower temperature than that entering the reactor, leaves the reactor through line 131 and is transferred to the regenerator 135. A suitable quantity of air, together with other fuel as required, from line 133, is likewise passed to the regenerator. In the regenerator, coke is burned off the sand and the temperature of the sand substantially raised. Combustion gases are vented at 137, and the regenerated hot sand transferred back to reactor 127 through line 123.

The reaction products issuing from reactor 127 through line 129 pass to the separation-recovery system 141, highly schematized in FIGURE 3. However, essentially as shown previously, various products and recycle streams may be separated out. Products, in this case, propylene, methyl acetylene, and acetylene, are shown at 143. Hydrogen sulfide, to be passed to the reconversion step, is shown at 139. Unreacted sulfur and small quantities of unreacted light hydrocarbons to be recycled to the reactor are shown at 145. Methane, ethylene, and in this case tar, to be used as fuel, are shown at 135.

The reactor system in FIGURE 3 is only one of many possible types employing non-catalytic solids as heat carriers. Various others using fine solids, similar to those for fluid catalytic cracking and fluid coking processes, may be employed. Systems using larger solid particles, such as those used in moving beds with either air lift or mechanical means of transfer may likewise be employed. Similarly, a fixed bed system may be used, wherein the feed is passed over static solids for a given period of time, after which the feed is discontinued and air (together with fuel gas or tar if necessary) then passed over the solids to burn off carbon and reheat the solids.

The foregoing technology is well known to those skilled in the art, and any of these systems may be used to carry out practically the novel process of my invention.

*Example 1*

Example 1 illustrates the use of the embodiment shown in FIGURE 1 to produce propylene and methyl acetylene without a catalyst, with an average reaction temperature of about 1150° F., and an average reactor pressure of 45 p.s.i.a. The feed is 96.0% propane obtained from natural gasoline. All quantities are converted to the basis of 1000 pounds of hydrocarbon feed. On this basis, 26 pounds of elemental sulfur are required from an outside source to make up for sulfoxidation process losses; this net quantity of sulfur is in this case obtained from an extraneous hydrogen sulfide stream fed to a common reconversion unit as described above.

Table A illustrates the various material balance quantities in this example. A yield of 52.8 weight percent of propylene is obtained together with 32.8 weight percent of methyl acetylene. The combined yield of light gas and tar (only 9.2 weight percent) is small enough to be conveniently used for miscellaneous fuel requirements.

*Example 2*

Example 2 illustrates the use of the embodiment shown in FIGURE 2. Reaction temperatures (1090° F. and 1015° F.) are relatively low, by reason of the use of a two-stage catalytic system for the sulfoxidation step. The reconversion step is carried out using 95% oxygen, with the effluent from the reconversion passed directly back to the sulfoxidation step without separating out the steam produced in the reconversion step. The average reactor pressure in the sulfoxidation step is 80 p.s.i.a.

The feed is the same as utilized in Example 1. The make-up requirement of elemental sulfur is very small because of the reconversion step design, wherein it is not necessary to obtain high conversions of hydrogen sulfide.

Table A provides material balance quantities for this example. In this case, the yield of propylene is 68.7 weight percent based on the hydrocarbon feed. A yield of 19.6 weight percent of methyl acetylene is also obtained. Tar and light gas yields are again very low.

*Example 3*

Example 3 illustrates the operation of the embodiment shown as FIGURE 3. No catalyst is employed; however, sand is used as a heat carrier for the fluid bed sulfoxidation reactor system.

The average temperature of the sulfoxidation reactor is 1410° F. The average reactor pressure is 20 p.s.i.a.

The fresh feed in this case is a refinery stream containing 81.0% propane, together with 10.4% propylene, and smaller quantities of C₄ and higher hydrocarbons. Make-up sulfur requirements are somewhat larger because of the greater amount of tar produced.

As a result of the higher sulfoxidation step reaction temperatures, significant amounts of ethylene and acetylene are produced by the sulfoxidation reactions. In this case, the amount of acetylene produced is sufficient in quantity to warrant its recovery.

Table A illustrates material balance quantities for this case. The propylene yield is 15.2 weight percent based on the total hydrocarbon feed. The yield of methyl acetylene is substantially greater being 50.9 weight percent. A yield of 8.1 weight percent of acetylene is likewise obtained.

TABLE A.—EXAMPLES 1, 2 AND 3

|  | Example Number | | |
|---|---|---|---|
|  | 1 | 2 | 3 |
|  | Figure Number | | |
|  | 1 | 2 | 3 |
|  | Catalyst | | |
|  | None | C r-Bi-P(a) Ni-Al(b) | None |
| Avg. Reaction Temp., °F | 1,150 | 1,090(a) 1,015(b) | 1,410 |
| Avg. Reactor Pres., p.s.i.a | 45 | 80 | 20 |
| Fresh Feed, lbs.: | | | |
| Propane | 960 | 960 | 810 |
| Propylene | | | 104 |
| Butanes | 40 | 40 | 58 |
| Butylenes | | | 6 |
| Higher Hydrocarbons | | | 22 |
| Make-Up Sulfur | 26 | 7 | 68 |
| Total Feed, lbs.: | | | |
| Propane | 1,140 | 1,910 | 842 |
| Propylene | 12 | 642 | 104 |
| C₄+ | 78 | 192 | 95 |
| Sulfur | 1,866 | 3,929 | 1,204 |
| Hydrogen Sulfide | | 85 | |
| Steam | | 449 | |
| Nitrogen, Argon | | 21 | |
| Reactor Effluent, lbs.: | | | |
| Propane | 180 | 950 | 32 |
| Propylene | 540 | 1,329 | 152 |
| Methyl Acetylene | 328 | 196 | 509 |
| C₁, C₂ | 72 | 39 | 227 |
| Tar | 20 | 42 | 70 |
| C₄+ | 38 | 152 | 9 |
| Sulfur | 773 | 3,113 | 191 |
| Hydrogen Sulfide | 1,151 | 935 | 1,055 |
| Steam | | 449 | |
| Nitrogen, Argon | | 21 | |
| Products, lbs.: | | | |
| Propylene | 528 | 687 | 152 |
| Methyl Acetylene | 328 | 196 | 509 |
| Acetylene | | | 81 |

I claim:

1. The process which comprises contacting a light hydrocarbon stream with elemental sulfur in proportions corresponding to from 0.25 to 2.5 moles of S₂ per mole of C₃ and heavier hydrocarbons in the total feed, at a temperature from 1000° F. to 1450° F., a pressure from 5 to 300 p.s.i.a. and with a contact time from 0.5 to 100 seconds, and recovering methyl acetylene and propylene as major products.

2. The process of claim 1 in which the light hydrocarbon stream contains substantial quantities of at least one hydrocarbon of a carbon number between 3 and 6.

3. The process of claim 1 in which the light hydrocarbon stream is substantially propane.

4. The process of claim 1 in which the light hydrocarbon stream is substantially of a carbon number of 3 and is derived from oil refinery processing operations.

5. The process of claim 1 in which propylene is recycled to produce additional methyl acetylene.

6. The process of claim 1 in which said reaction is carried out over a catalyst comprising a metallic sulfide and in which said temperature is between about 1000° F. and 1250° F.

7. The process of claim 1 in which said reaction is carried out over a solid, substantially non-catalytic contact agent and in which said temperature is between about 1150° F. and 1450° F.

8. The process of claim 6 in which said reaction is carried out adiabatically.

9. An oxidative process which comprises contacting a light hydrocarbon stream with elemental sulfur in proportions corresponding to from 0.25 to 2.5 moles of S₂ per mole of C₃ and heavier hydrocarbons in the total feed, in an endothermic reaction at a temperature from 1000° F. to 1450° F., a pressure from 5 to 300 p.s.i.a. and with a contact time from 0.5 to 100 seconds to produce methyl acetylene, propylene and hydrogen sulfide, and contacting said hydrogen sulfide with an oxygen-containing gas in a second, exothermic reaction step to produce a predominant part of the elemental sulfur required in said first reaction.

10. The process of claim 9 in which the light hydrocarbon stream is substantially of a carbon number of 3.

11. The process of claim 9 in which propylene is recycled to produce additional methyl acetylene.

12. The process of claim 9 in which the first-said reaction is carried out over a catalyst comprising a metallic sulfide and in which said temperature is between about 1000° F. and 1250° F.

13. The process of claim 9 in which the first-said reaction is carried out over a solid, substantially non-catalytic contact agent and in which said temperature is between about 1150° F. and 1450° F.

14. The process of claim 12 in which the first-said reaction is carried out adiabatically.

15. The process of claim 9 in which a substantial part of the endothermic heat required in said first reaction is supplied by exchanging the feed thereto with the products of said second, exothermic reaction.

16. The process of claim 12 in which a substantial part of the endothermic heat required in said first reaction is supplied by exchanging the feed thereto with the products of said second, exothermic reaction.

17. The process of claim 14 in which a substantial part of the endothermic heat required in said first reaction is supplied by exchanging the feed thereto with the products of said second, exothermic reaction.

18. The process of claim 9 in which said second, exothermic reaction step is carried out using substantially purified oxygen, substantially the total effluent from said second step being fed without separation for use in said first reaction step.

19. The process which comprises reacting substantially propane with elemental sulfur in proportions corresponding to from 0.25 to 2.5 moles of S₂ per mole of C₃ and heavier hydrocarbons in the total feed, at a temperature from 1000° F. to 1400° F., with a contact time from 0.5 to 100 seconds, and at substantially atmospheric pressure, and recovering methyl acetylene.

20. An oxidative process which comprises a first step of reacting substantially propane with elemental sulfur in proportions corresponding to from 0.25 to 2.5 moles of S₂ per mole of C₃ and heavier hydrocarbons in the total feed, in an endothermic reaction at a temperature from 1000° F. to 1450° F., with a contact time from 0.5 to 100 seconds and at substantially atmospheric pressure to produce methyl acetylene, propylene and hydrogen sulfide, and reacting said hydrogen sulfide with an oxygen-containing gas to produce a predominant part of the elemental sulfur required in said first reaction.

(References on following page)

References Cited

UNITED STATES PATENTS

| | | | |
|---|---|---|---|
| 1,880,310 | 10/1932 | Wulff | 260—679 |
| 2,236,534 | 4/1941 | Hasche | 260—679 |
| 2,236,555 | 4/1941 | Wulff | 260—679 |

FOREIGN PATENTS 1,190,457  4/1965  Germany.

OTHER REFERENCES

"Chemical Abstract," volume 42, page 5889, F. Wessely et al., Monatsh 77, pages 282–92 (1947).

DELBERT E. GANTZ, Primary Examiner.

J. O. MEYERS, Assistant Examiner.